March 15, 1932. K. W. LOGAN 1,849,429
DIFFERENTIAL GEAR
Filed Sept. 29, 1930
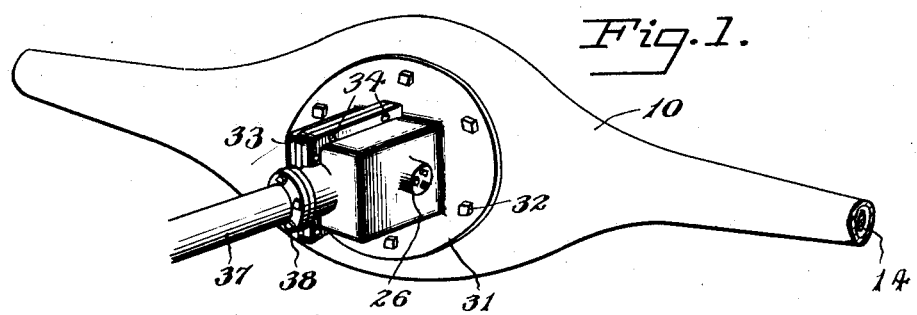
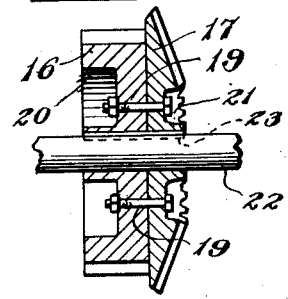
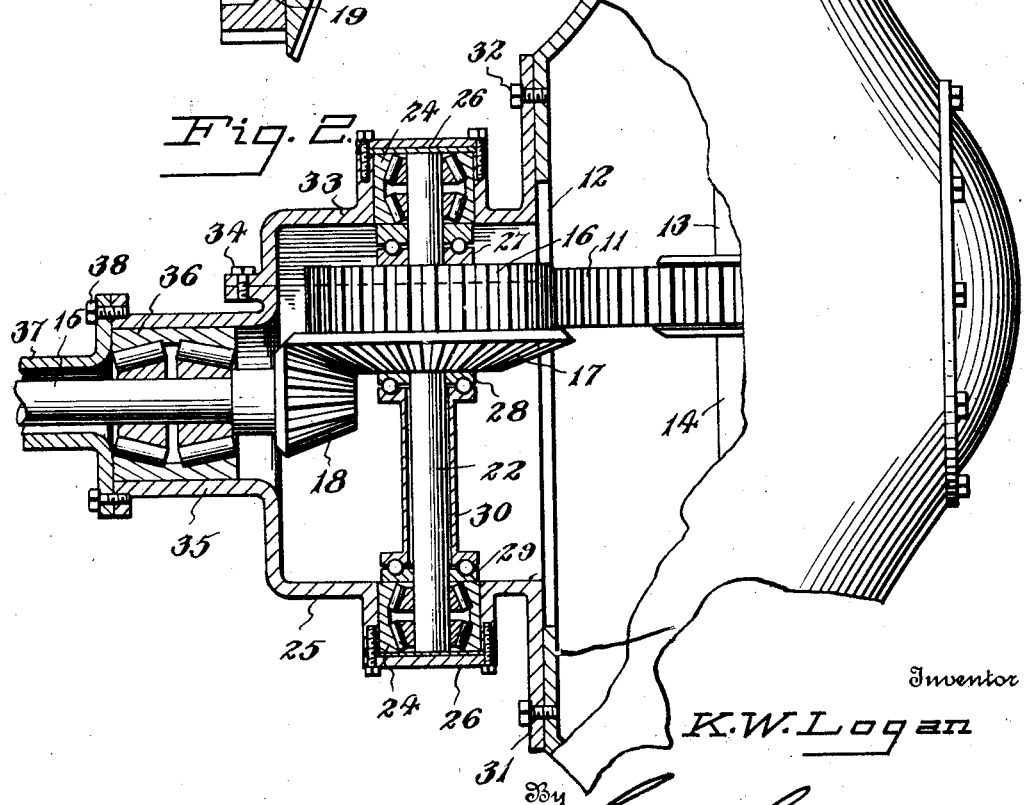
Inventor
K. W. Logan
By Lacey & Lacey, Attorneys Patented Mar. 15, 1932

1,849,429

UNITED STATES PATENT OFFICE

KYLE W. LOGAN, OF ROANOKE, VIRGINIA

DIFFERENTIAL GEAR

Application filed September 29, 1930. Serial No. 485,247.

This invention relates to differential gears and has for an object to provide an auxiliary or intermediate set of gears interposed between the propeller shaft gear and the ring gear of a differential to increase the power transmitted by the propeller shaft at a given speed, the invention being particularly applicable to slow moving vehicles, such as trucks, and to automobiles to be used under such rough conditions of service that great power must be available for traction purposes.

A further object of the invention is to provide an auxiliary gearing comprising essentially a bevel gear and a spur gear bolted together, the bevel gear being in mesh with the pinion of the propeller shaft and the spur gear being in mesh with the ring gear of the differential, said spur and bevel gear being bolted together side by side, and keyed to a common shaft, so that an extremely rigid and strong unitary assembly of the parts is effected.

With the above and other objects in view the invention consists in certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification:

Figure 1 is a perspective view showing a differential gear equipped with my improved auxiliary gear.

Fig. 2 is a horizontal cross sectional view of the parts in elevation showing the details of construction of the auxiliary gear, and Fig. 3 is a detail cross sectional view showing the spur gear and bevel gear bolted together side by side.

Referring now to the drawings in which like characters of reference designate similar parts in the various views, 10 designates a differential gear housing and 11 the ring gear of the differential. The housing is provided in the front wall thereof with an enlarged opening 12 to accommodate the auxiliary gear mechanism hereinafter described. Usually, the ring gear 11 of a differential, through which the axles 13 and 14 are driven, is disposed to the left of the propeller shaft 15. In adapting the present invention to the usual differential, the differential is reversed endwise from left to right to position the ring gear to the right of the propeller shaft so that the ring gear will mesh with the hereinafter described spur gear.

Referring now more particularly to Fig. 2, it will be seen that in carrying out the invention, I provide a spur gear 16 which is adapted to mesh with the ring gear 11 of the differential, and rigidly secured to the side of the spur gear is a bevel gear 17 which is adapted to mesh with the pinion 18 of the propeller shaft 15. As shown in Fig. 3, the spur gear and bevel gear are preferably bolted rigidly together by means of a plurality of bolts 19, there being suitable depressions 20 and 21 formed in the spur gear and in the bevel gear to receive respectively the nut and head of each bolt.

An idler shaft 22 is provided and the spur gear 16 and bevel gear 17 are fixed to the shaft by means of a key 23, as best shown in Fig. 3. The ends of the shaft are journaled in suitable roller bearings 24 carried by a gear case 25. Suitable caps 26 are bolted to the gear case to permit of removal of the shaft 22 therefrom and also to permit assembling and disassembling of the parts.

Sets of ball bearings 27, 28 and 29, as best shown in Fig. 2, are mounted on the idler shaft to take up endwise thrust of the shaft. Preferably, a spacing sleeve 30 maintains the proper distance between the sets of ball bearings 28 and 29 and prevents dislodgment of the parts under severe conditions of service.

The auxiliary gear case 25 is provided at the rear end with a circular base flange 31, as best shown in Figs. 1 and 2, the flange being of sufficient diameter to close the opening 12 in the differential housing 10. A plurality of bolts 32 secure said base flange to the differential housing. As best shown in Fig. 1, the gear case 25 is preferably formed with a removable side section 33 which is bolted in place, as shown at 34, and when removed permits disassembling of the gears 16 and 17 and shaft 22 from the gear case.

It will be seen that the gear case 25 is provided at the forward end with a cylindrical extension 35 in which are mounted roller bearings 36 of usual construction to mount the propeller shaft 15. The extension 35 is bolted to the propeller shaft housing 37, as shown at 38.

By referring now particularly to Fig. 2, it will be seen that the bevel pinion 18 of the propeller shaft meshes with the bevel pinion 17 of the auxiliary gear and reduces the speed of the propeller shaft as transmitted through the gear 17, and consequently increases the power imparted by said gear commensurate with the reduction in speed so that great power will be available for heavy duty work. Furthermore, by virtue of the spur gear 16 being of considerable diameter and therefore exhibiting a large number of teeth, the ratio between the spur gear 16 and ring gear 11 of the differential will be much greater than is to be found in the usual differential construction in which, for instance, the propeller shaft pinion 18 meshes direct with the ring gear 11 and consequently greater speed will be imparted by my improved auxiliary gear to the ring gear than can ordinarily be obtained.

It will be particularly pointed out that the bevel gear 17 and spur gear 16 are both mounted to efficiently connect the driving pinion 18 with the ring gear 11 without mutilating and consequently weakening either the spur gear 16 or bevel gear 17, or employing a multiplicity of parts to effect the connection between the driving pinion 18 and ring gear 11.

From the above description it is thought that the construction and operation of my invention will be clearly understood without further description.

Having thus described the invention, I claim:

In combination, a differential gear, a ring gear incorporated therein, a propeller shaft, a pinion on said propeller shaft, a transverse shaft between said ring gear and said bevel pinion, a spur gear on said transverse shaft meshing with said ring gear, a bevel gear on said transverse shaft meshing with said bevel pinion, bolts rigidly securing said spur gear and said bevel gear together side by side on said transverse shaft, there being depressions in said spur gear and said bevel gear receiving the heads and nuts of said bolts, a gear case secured to the housing of the differential gear and operatively mounting both said propeller shaft and said transverse shaft, sets of roller bearings in said gear case mounting said transverse shaft to idle with minimum friction, sets of thrust bearings in said gear case for receiving the end thrust of said transverse shaft, and a spacing sleeve disposed on said shaft between said thrust bearings.

In testimony whereof I affix my signature.

KYLE W. LOGAN. [L. S.]